United States Patent [19]

Genequand et al.

[11] 4,375,380
[45] Mar. 1, 1983

[54] PROCESS AND INSTALLATION FOR MANUFACTURING A PHOTOTHERMAL CONVERTER APPARATUS

[75] Inventors: Pierre Genequand, Geneva; Guy N. Hindi, Onex; Daniel Gross, Geneva; Hermann Pfeifer, Moillesulaz; Reinhard Kalbskoph, Onex, all of Switzerland

[73] Assignee: Battelle Development Corporation, Columbus, Ohio

[21] Appl. No.: 280,103

[22] Filed: Jul. 2, 1981

Related U.S. Application Data

[63] Continuation of Ser. No. 101,152, Dec. 7, 1979, abandoned.

[51] Int. Cl.$^3$ ............................ A46D 1/00; B32B 5/00
[52] U.S. Cl. ........................................ 156/72; 126/417; 126/441; 126/449; 156/265; 156/297; 156/298; 156/303.1; 156/324.4; 156/517; 156/561; 156/562; 156/578; 350/96.24; 428/96; 428/119
[58] Field of Search ............. 156/72, 303.1, 89, 324.4, 156/265, 517, 297, 561, 298, 562, 578; 65/43, 56; 126/417, 449, 441; 428/96, 119; 300/4, 21, 5; 165/185; 350/96.24

[56] References Cited

U.S. PATENT DOCUMENTS

| | | |
|---|---|---|
| 2,078,358 | 4/1937 | Wright et al. .......................... 300/21 |
| 2,508,908 | 5/1950 | Enchelmaier .......................... 300/21 |
| 3,253,896 | 5/1966 | Woodcock et al. .................... 65/56 |
| 3,717,531 | 2/1973 | Smith .................................. 156/180 |
| 3,867,219 | 2/1975 | Bondi .................................... 156/72 |
| 3,963,456 | 6/1976 | Tsuchiya et al. .................... 29/739 |
| 4,117,829 | 10/1978 | Grosset al. ........................ 126/449 |
| 4,132,449 | 1/1979 | Bergman ............................... 300/21 |

Primary Examiner—John J. Gallagher
Attorney, Agent, or Firm—Barry S. Bissell

[57] ABSTRACT

The manufacturing of at least one photothermal converter element according to the invention consists essentially of implanting a multiplicity of substantially uniformly distributed parallely projecting transparent fibers onto a baseplate element provided with an absorbing coating of a normally solid material capable of being temporarily converted to a plastic state, thanks to the use of an array of guiding means arranged above the baseplate element. The implantation proper of the desired fiber structure is then performed by advancing a series of bundles of fibers through the array of guiding means, to the desired level above the baseplate element, and by clipping the advanced bundles to the desired length above the guiding means, so as to cause the falling with limited transverse spreading of the clipped fibers onto the coating of the baseplate element. This coating being concurrently converted to its plastic state, the clipped fibers are then caused to adhere to the plastic coating, which is then solidified so as to firmly secure the adhering fibers. The array of guiding means is finally withdrawn from the firmly secured fiber structure. The baseplate element thus provided with such a firmly secured fiber structure thereby constitutes a photothermal converter element.

9 Claims, 11 Drawing Figures

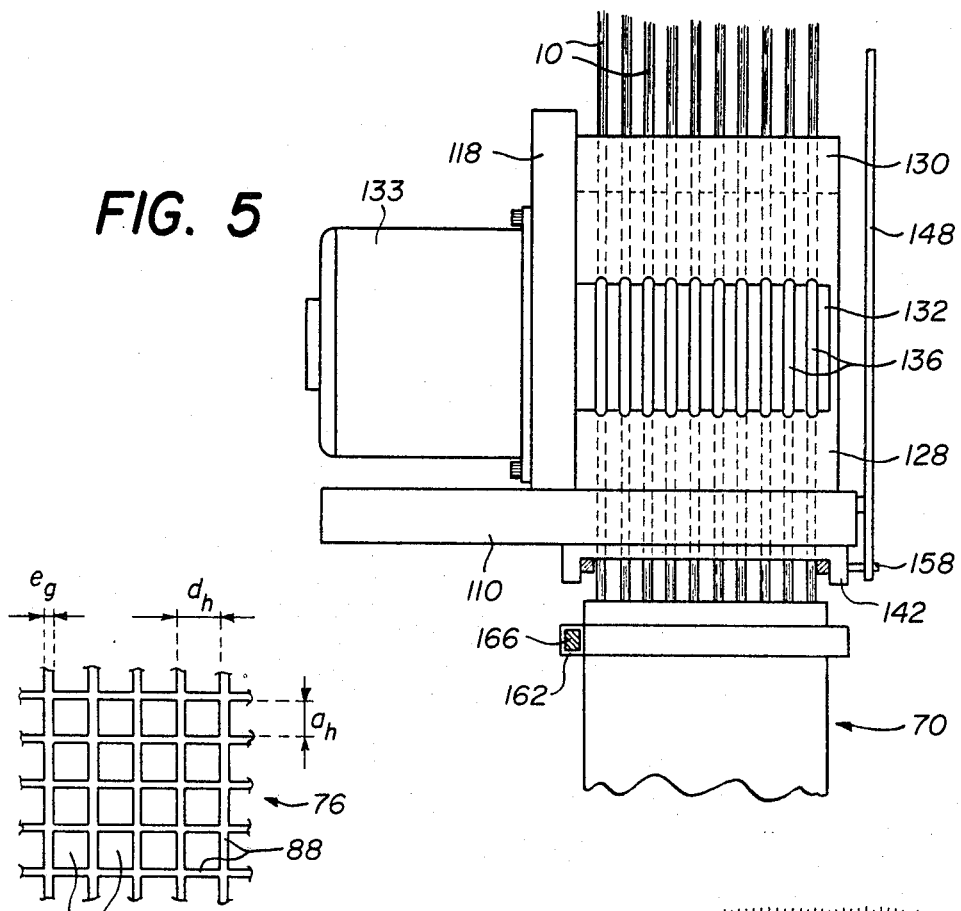
FIG. 5
FIG. 6
FIG. 7
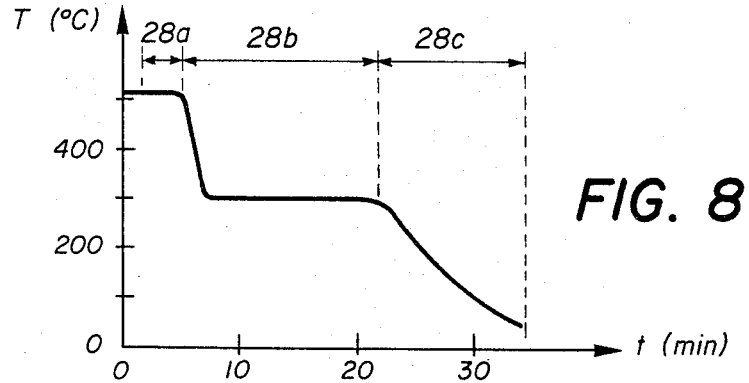
FIG. 8

PROCESS AND INSTALLATION FOR MANUFACTURING A PHOTOTHERMAL CONVERTER APPARATUS

This application is a continuation, of application Ser. No. 101,152, filed Dec. 7, 1979, now abandoned.

The invention relates to a process and installation for manufacturing a photothermal converter apparatus comprising at least one photothermal converter element consisting of a baseplate element provided with a multiplicity of substantially uniformly distributed parallely projecting fibers transparent to incident photon energy, which are secured to said baseplate element by means of a bonding coating further adapted to absorb incident photon energy.

U.S. Pat. No. 4,117,829 discloses a photothermal converter apparatus in the form of a fur-like configuration. The present invention is directed to the production of such a photothermal conversion fur. The details of the fur are being incorporated herein by reference to the aforementioned U.S. patent.

Evidently a fur-like element or photothermal conversion fur according to the mentioned U.S. patent is difficult to produce manually in amounts necessary for, for instance, solar energy collectors intended to supply for instance buildings with heat energy.

The invention as claimed is intended to provide a remedy. It solves the problem of how to produce on an industrial scale a photothermal converter comprising a base, preferably of metal, provided with a dense fiber structure composed of a multiplicity of substantially uniformly distributed parallely projecting relatively long fibers, preferably of glass, the preferred dimensions of which are furthermore the following: constituent fibers of the structure having a length of the order of 6.5 cm and a diameter of the order of 65 $\mu$m, spaced apart so as to give a density of the order of 500 fibers per cm$^2$ (corresponding to distance between fibers of the order of 450 $\mu$m), with a maximum allowed angular dispersion with respect to the average fiber orientation less than $\pm 5°$ (and preferably less than $\pm 2°$).

The advantages of the invention are a highly automatic production of fur-like elements, which can be put together or combined in order to form photothermal converters of larger surface area.

The accompanying drawings show, schematically and merely by way of example, one embodiment and variations of an installation for carrying out the process which forms the object of the present invention.

FIG. 5 is a side view of the device of FIG. 4.

FIG. 6 is a partial plan view of a first detail of FIG. 4.

FIG. 7 is a partial plan view of a second detail of FIG. 4.

FIG. 8 is a diagram showing the thermal treatment applied during the fiber implantation proper.

Figure 1:
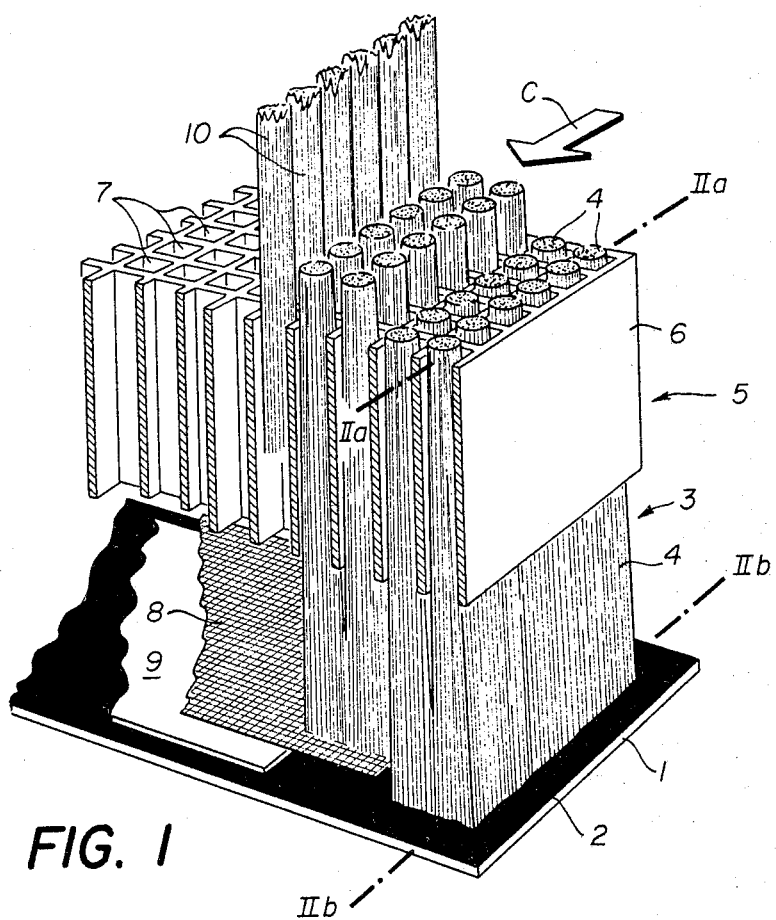
FIG. 1 is a partial perspective sketch explanatory of the principle carried into effect in the process of the present invention.

The process according to the invention for manufacturing at least one photothermal converter element consists essentially of implanting a multiplicity of substantially uniformly distributed parallely projecting fibers transparent to incident photon energy onto a baseplate element provided with an absorbing coating of a normally solid material capable of being temporarily present in a plastic state, thanks to the use of an array of regularly distributed downwardly extending means arranged above said baseplate element. The implantation proper of the desired fiber structure onto the baseplate element is then performed by advancing a series of bundles of fibers through the array of guiding means, said advancing being then stopped when the lower free ends of the guided bundles protrude at the desired level above the baseplate element. The stopped bundles are then clipped to the desired length above said guiding means, so as to cause the falling with transverse spreading of the fibers of the clipped bundles onto the the coating of the baseplate element. The transverse spreading of the clipped fibers is furthermore limited by their continuous guiding through the guiding means throughout their falling, thereby leading to the desired substantially uniform distribution of said clipped fibers onto the baseplate element, together with the desired substantially parallel projection of said clipped fibers from said baseplate element. The absorbing coating of the baseplate element being concurrently in its temporary plastic state, the clipped fibers are then retained by said plastic coating, which is then solidified so as to secure the retained fibers. The array of guiding means and/or the baseplate element are finally moved relatively away from one another, so as to have the array of guiding means completely withdrawn from said multiplicity of thus firmly secured fibers. The baseplate element thus provided with such a firmly secured fiber structure thereby constitutes said photothermal converter element.

The above process is illustrated in schematic manner in the FIG. 1, where there can be seen a baseplate element 1 covered with a coating 2 of a normally solid material capable of being temporarily present in a plastic state, which material is further adapted for absorbing incident photon radiation (such a material will be described in more detail afterwards). The baseplate element 1 is preferably made of metal, such metal being furthermore advantageously selected among those having high heat-conducting properties, such as copper or aluminium. Above said baseplate element 1 is disposed an array of regularly distributed downwardly extending guiding means 5, which can be advantageously constituted by a thick plate 6 pierced with a matrix of vertically extending square holes 7 regularly distributed in rows and columns. The implantation of the desired fiber structure 3 onto the baseplate element 1 is then performed by advancing through the hole matrix 5 a series of bundles of fibers 10, each of which is composed of a plurality of fibers of indefinite length bundled in substantially parallel relationship. The fibers constitutive of each bundle are made of a material transparent to incident photon radiation, such as glass (for instance E-glass), said fibers being furthermore advantageously covered with a protecting coating (intended to prevent fiber embrittlement due to water attack, which might result in fiber breaking during the implantation operations). A coating material with low diffusion properties may also be applied to the fibers to prevent scatter of incident radiation. The number of fibers within each of said bundles 10 is besides chosen with respect to the number of holes per unit area of the hole matrix 5 so that the product of these two figures be equal to the fiber density desired for the fiber structure 3 to be implanted. The above advancing is then stopped when the free lower ends of the bundles 10 protrude at the desired level above the baseplate element, said protruding lower ends besides undergoing a slight transverse pre-spreading because of the tight-maintaining of upper portions of the bundles 10 above the array of guiding means 5 (by necessary advancing means). The stopped bundles 10 are then mechanically clipped above said array of guiding means 5 (clipping level illustrated by the arrow C on the drawing), to the length desired for the fiber structure 3, which causes the falling with further transverse spreading of the fibers 4 of the clipped bundles 10 onto the the coating 2 of the baseplate element 1 (further transverse spreading imparted by the clipping action and likely to be reinforced by air resistance during falling), thereby leading to the substantially uniform distribution desired for the fiber structure 3. The diagrams of FIGS. 2a and 2b, which show the fiber distribution at the respective levels IIa and IIb of the FIG. 1, fully illustrate the manner by which the overall spreading process enables the passage from a regular but discontinuous "bundle" distribution at the inlet of the array of guiding means 5 (level IIa—curve A of FIG. 2a) to a substantially uniform fiber distribution at the level of the baseplate element 1 (level IIb—curve B in full lines of FIG. 2b).

Figure 2A:
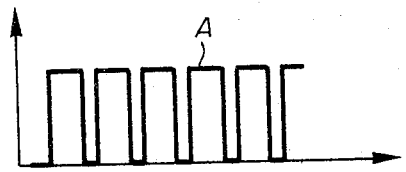
FIG. 2a and 2b are diagrams showing the fiber distribution at the respective levels IIa—IIa and IIb—IIb of the FIG. 1.
Figure 2B:
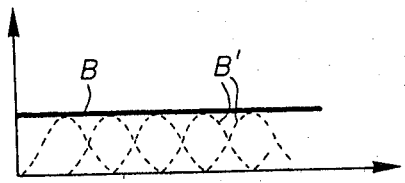

The above overall transverse spreading could however, if no specific precaution was taken, reach a value prohibitive with respect to the substantially parallel extension desired for the fiber structure 3, taking especially into account the strong transverse spreading likely to be imparted by the clipping action (i.e. shearing action). This overall transverse spreading is in fact successfully kept within the desired limits, thanks to the proper design of the array of guiding means 5, which provides through the falling of the clipped fibers 4 just enough guidance to ensure that the average angular dispersion of said clipped fibers 4 is kept within the allowed limits (of the order of $\pm 2°$). Such a limited transverse spreading presents the additional advantage of limiting the overlapping between fibers 4 coming from adjacent bundles 10 (cf. curves B' in dotted lines of FIG. 2b showing the distribution of the individual bundles when impinging the baseplate element), thereby improving the uniformness of the overall fiber distribution onto the baseplate element 1.

It may therefore be seen that the above spreading process constitutes a judicious compromise between the necessity of providing a certain amount of transverse spreading during the falling of the clipped fibers, in view of obtaining a substantially uniform distribution for the desired fiber structure 3, and the opposite necessity of nevertheless limiting such a transverse spreading to an acceptable value, in view of maintaining a substantially parallel orientation between the different fibers of this desired fiber structure 3. The different dimensions of the array of guiding means 5 required for the obtention of such a result, which in turn depend on the different geometrical parameters desired for the fiber structure 3, will be examplified afterwards.

The coating 2 of the baseplate element 1 being concurrently present in its plastic state for causing the retaining of the clipped fibers 4 brought to its contact, this coating 2 is then solidified so as to firmly secure the retained fibers 4, and the array of the guiding means 5 is finally upwardly removed, and/or the baseplate element 1 downwardly removed, so as to have the array of guiding means completely withdrawn from said thus secured fiber structure 3. The baseplate element 1 thus provided with the fiber structure 3, secured to it by means of the bonding and absorbing coating 2, thereby constitutes a photothermal converter element.

Prior to the solidification of the coating 2 in its plastic state, one may additionally, in a particularly advantageous manner, exert a certain pushing down onto the upper ends of retained fibers 4, in order to increase the penetration of said retained fibers into the thickness of the plastic coating 2, thereby enabling to improve the definitive securing of the fibers 4 to the baseplate element 1. To this end, the array of guiding means 5 may be advantageously designed so that the height of its upper surface above the level implantation (level of baseplate element 1) is slightly less than the length desired for the fiber structure 3, in order to enable that the upper ends of the retained fibers 4 to be pushed down protrude slightly above said upper surface.

The bonding and absorbing coating into which the clipped fibers are to be implanted may be made of any normally solid material capable of being temporarily present in a plastic state provided that it is further adapted for absorbing incident photon energy. The expression "normally solid material capable of being temporarily present in a plastic state" intends in the present specification to designate any normally solid material capable of being temporarily present in a state, the viscosity of which is sufficiently low for enabling the retaining of fibers put to its contact (such material in this temporary state besides advantageously possessing a good wettability with respect to the fiber material, so as to reinforce the retaining), the bringing of said temporarily plastic material to its normally solid state hereby causing the definitive securing of said fibers thereto.

The bonding and absorbing coating made of such a material may be initially present on the baseplate element (i.e. when deposited) in its temporary plastic state, in which case the fiber implantation has to be carried out when this coating is still present in its plastic state (its subsequent solidification furthermore ensuring the definitive securing of the implanted fibers). Such a bonding and absorbing coating may on the contrary be initially present on the baseplate element in a state other than said temporary plastic state (for instance in a powdery state), in which case said coating has to be temporarily brought to a plastic or molten state in view of enabling the fiber implantation (its subsequent solidification also ensuring the definitive securing of the implanted fibers). In that last case, the softening of the coating of its plastic or molten state may be carried out, alternatively, prior to the arrival of the clipped fibers onto it, or only subsequently to said arrival.

As possible materials for this bonding and absorbing coating, one may thus envisage, in a particularly advantageous manner, to use materials formed from at least two chemically compatible components, i.e., a first component possessing high absorbing properties and a second component possessing good bonding properties, these components as well as their proportions being furthermore selected so that the resulting mixture material possesses the desired combined bonding and absorbing properties. In a preferred manner, such a resulting mixture material will be designed so that the bonding component constitutes the major part, the absorbing component being then incorporated as an additive in the body of the bonding component.

As bonding component capable of enabling the resulting mixture material to be temporarily present in a plastic state, one may thus envisage to use materials such as "thermoplastic" or thermofusible materials, i.e. normally solid materials which are capable of being temporarily brought in a plastic or molten state by heating and of being resolidified by cooling (the word "thermoplastic" having thus therein to be taken in a sense substantially larger than that generally accepted in the field of plastic materials since intended in particular to cover materials such as glasses). Such materials have, of course, to be selected so the resulting mixture material presents a softening or melting point substantially lower than that of the materials constitutive of the fibers to be implanted, so as to prevent the undue degradation of these fibers. As possible materials, one will thus envisage in a particularly advantageous manner to use solder glass, which presents a softening point substantially lower than that of conventional glasses. Such thermoplastic or thermofusible materials should also advantageously be selected so that the thermal expansion coefficient of the resulting mixture material matches as closely as possible the thermal expansion coefficient of the material constitutive of the baseplate element, so as to avoid the bending of the latter during the cooling treatment (bending likely to cause a divergence prohibitive for the implanted fiber structure, and also to result in a fatigue of the implanted baseplate element the operational lifetime of the photothermal converter, due to the temperature variations).

The above risk of bending of the baseplate element during the cooling treatment of the thermoplastic coating may besides be further avoided by an additional adequate mechanical stiffening of the baseplate element, by for instance initially providing this baseplate element with properly oriented mini-corrugations.

As bonding component capable of enabling the resulting mixture material to be temporarily present in a plastic state, one may also envisage to use materials which are initially present in a plastic state (but nevertheless capable of being solidified later on). As such materials, one may thus envisage to use materials initially present under the form of solutions (for instance polymers having adhesive characteristics soluble in an adequate solvent). The ulterior solidification of such materials may be then obtained naturally (for instance polymerization in the ambiant air in case of prepolymer mixtures, or natural evaporation in case of a solution or a slurry) or by any appropriate additional treatment (for instance heating in view of increasing polymerization in case of prepolymer mixtures, or drying in view of increasing solvent evaporation in case of a solution or a slurry or even UV irradiation in case of photopolymer mixtures).

As absorbing component to be incorporated in the body of the bonding component, one may furthermore envisage to use any black coloring agent capable of conferring the required absorbing properties to the resulting mixture material, such carbon black glassy enamels, adequate transition metal oxides, etc.

As possible resulting mixture materials for the bonding and absorbing coating intended to receive the fiber structure, one may thus envisage, by way of example, to use a mixture material comprising as bonding component, a solder glass (for instance a solder glass commercialized under the trademark SCHOTT 8471), and as absorbing component, a black decorating glass comprising oxides of at least one metal selected within the group Mn, Fe, Co, Ni (for instance a black decorating glass commercialized under the trademark DEGUSSA Dekorglass 14004). Such a mixture material may be firstly deposited onto the baseplate in the form of the slurry and then dried, the dried material being then linked up to its melting point for ensuring the fiber implantation proper and cooled back to the ambiant temperature for its definitive solidification (the solidified coating then consisting of an homogeneous glassy composition).

The bonding and absorbing coating into which the fiber structure is to be implanted may furthermore be deposited onto the baseplate element according to all the known techniques such as transfer (by means for instance of rollers or cylinders), spraying, etc. Such a deposition may besides be carried out in a single step, so as to give a coating consisting of a single layer, or on the contrary of superposed layers (possibly made of a different material for each). This deposition will at last be carried out so as to give an overall coating having a thickness large enough (with no uncovered zones) for enabling a good implantation as well as a good absorbing, but nevertheless as small as possible for minimizing thermal inertion (as well as production costs). In a preferred manner, this overall coating will thus possess a thickness comprised between about 0.1 and 0.5 mm.

Concerning the above-described manufacturing process, one may furthermore envisage, in a particularly advantageous manner, to provide an intermediate array of distribution-maintaining means above the baseplate element, prior to the clipping of the bundles of fibers, so as to help to maintain the substantially uniform distribution of the clipped fibers throughout the different treatments applied subsequently to the falling of said clipped fibers through said array of distribution-maintaining means onto said baseplate element.

One may additionally envisage, in an equally particularly advantageous manner, to interpose (also prior to the clipping of the bundles) a temporary support means between the above intermediate array of distribution-maintaining means and the baseplate element, in order for instance to delay the operation of implantation of the clipped fibers onto the baseplate element with respect to the operation of injection of the bundles through the array of guiding means (i.e. bundle advancing+clipping), instead of performing these two operations simultaneously as described previously. Such a delaying may be used for instance for performing a sequential injection of the bundles through the array of guiding means, while subsequently performing a "one-shot" implantation of the clipped fibers, after the removal of said temporary support means.

The above possibilities are schematically illustrated in the FIG. 1, where there can be seen an intermediate array of distribution-maintaining means 8 disposed above the baseplate element 1, advantageously constituted by a fine mesh grid. Such a fine mesh grid 8 is advantageously designed so as to have a mesh width below the average fiber-to-fiber distance desired for the fiber structure 3, but, of course, above the fiber diameter. On the FIG. 1, there can also be seen a temporary support means 9 interposed between the fine mesh grid 8 and the baseplate element 1, advantageously constituted by a laterally removable plate.

In the above-described process, the different elements thus superposed above the baseplate element, i.e. the upper array of guiding means, the intermediate array of distribution-maintaining means and the lower temporary support means, may furthermore in a quite advantageous manner be connected by means of at least one common frame, so as to form at least one integral unit movable at will as a whole. Such an integral unit is intended to facilitate the whole handling, by serving as a temporary fiber holder for enabling the placing and maintaining of the fiber structure in its quasi-definitive substantially uniform distribution prior to its implantation into the bonding coating of the baseplate element (the lower temporary support means being then advantageously constituted by a sliding bottom plate). The providing of such a temporary fiber holder further makes possible the carrying out of the injection operation (bundle advancing+clipping+falling onto the temporary support means) at a location remote from that of the implantation operation, wherein said temporary fiber holder thus simultaneously serves as a transfer unit between these two remote locations.

As regards such a temporary fiber holder, one may envisage to use a single fiber holder, the extension of which will then be substantially identical to that of the baseplate element, or on the contrary a plurality of fiber holders, the extension of which will then be less than that of the baseplate element, said fiber holders being then intended to be disposed in a side-by-side relationship above said baseplate element, subsequently to their filling with clipped fibers. In this last case, the fiber holders may then be designed (with respect to a rectangular-shaped baseplate element) for having a length substantially equal to the width of the baseplate element, so as to be disposed transversally above said baseplate element during the implantation operation, or on the contrary for having a width substantially equal to the width of the baseplate element, so as to be then disposed longitudinally above said baseplate element.

As regards now the filling of such a temporary fiber holder, this filling may be performed in "one shot", by simultaneously advancing one bundle of fibers through each guiding means of the upper array of guiding means, and by simultaneously clipping all said advanced bundles at the desired length. Such a filling may on the other hand be performed sequentially, by for instance advancing a series of bundles through one row of the upper array of guiding means and by then clipping said advanced series of bundles, said advancing and clipping operation being then repeated for successive rows of said upper array of guiding means (these successive advancing and clipping operations being then advantageously able to be carried out with the same series of bundles, taking into account their indefinite length). In that last case of sequential filling, the injection of bundles through successive rows of the upper array of guiding means of the fiber holder may furthermore be advantageously performed at a fixed location, the fiber holder being then step-by-step advanced between two successive injection operations, transversally to the injection front.

Concerning the advancing proper of the bundles of fibers through the upper array of guiding means, such an advancing may furthermore be carried out according to any appropriate manner, for instance by using appropriate driving means associated with adequate guiding means suitably aligned with respect to the guiding means to be filled of the upper array of guiding means of the fiber holder.

As regards the bundles of fibers of indefinite length to be advanced through the upper array of guiding means, such bundles may furthermore be formed directly upwards of the advancing, by continuously bundling an appropriate number of fibers of indefinite length as they are for instance unwound from appropriate "monofilament" bobbins. Such bundles on the other hand may be formed well before the carrying out of the manufacturing process of the invention (by for instance the above process) and stored around appropriate bobbins until needed.

The photothermal converter elements manufactured by the above-described process may then advantageously be put together or combined in order to form photothermal converters of larger surface area. In case one desires for instance to design a flat plate collector having a photothermal converter apparatus incorporated therein, one may thus envisage to manufacture a plurality of strip-shaped photothermal converter elements, each of which is furthermore equipped with a cooling fluid tube welded along the rear face of the strip-shaped element (the tube welding being preferably carried out before the implantation of the fiber structure onto the strip-shaped baseplate element), and then to assemble in a side-by-side relationship said plurality of strip-shaped elements, which may be then kept together by inlet and outlet manifolds to which each cooling fluid tube is connected (such an assembling being able to be facilitated by for instance providing T-shaped connections at both ends of each cooling fluid tube). Such manifolds will be preferably arranged under the photothermal converter thus assembled, in order to minimize the non-collecting surface of the collector in which such a converter is to be incorporated.

Figure 3:
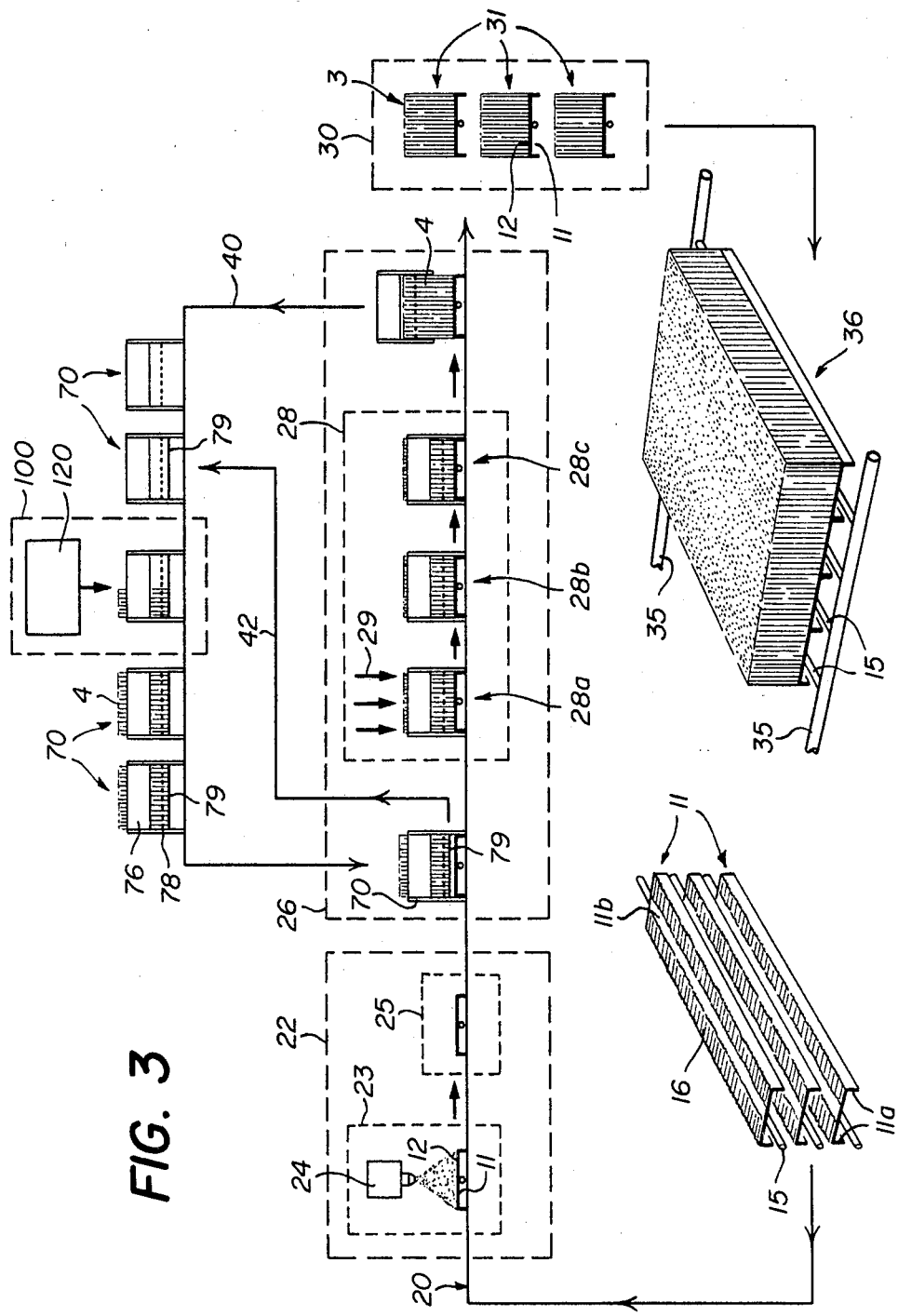
FIG. 3 is a schematic view of said embodiment.

The schematic view of the FIG. 3 illustrates an embodiment of an installation for manufacturing strip-shaped photothermal converter elements, intended to be incorporated after assembling in flat-plate collectors. This embodiment comprises a main line 20, designed for step-moving (by conventional means not shown on the drawing) a series of strip-shaped baseplate elements 11 through a coating zone 22 followed by a fiber implantation zone 26 (zones 22 and 26 to be described in more details thereafter), so as to provide at the outlet of the implantation zone 26 the desired strip-shaped photothermal converter elements 31.

The strip-shaped baseplate elements 11 proper are initially provided with two longitudinal rear-extending flanges 11a, as well as with a longitudinal pipe 15 welded along the rear face, so as to facilitate their ulterior assembling and incorporating in a flat-plate collector. As regards the dimensions, such baseplate elements 11 may for instance present a length of the order of 100 cm as well as a width of the order of 10 cm. These baseplate elements 11 are furthermore provided with a plurality of mini-corrugations 16 transversally arranged each side of this central longitudinal portion 11b (which central portion 11b preferably remains plane for properly receiving the longitudinal pipe 15). The function of these mini-corrugations 16 (the height and width of which are advantageously of the order of one and six millimeters, respectively) is to ensure a certain stiffening of the baseplate elements 11, so as to avoid their possible bending during subsequent thermal treatment, as it will be apparent from below.

These baseplate elements 11 (previously degreased by any adequate means) are firstly moved through the coating zone 22 comprising a slurry application station 23 followed by a heating pretreatment zone 25. At the station 23, and upright of the line 20, there is arranged a spraying device 24 fed with a slurry consisting of a powder mixture of solder glass (SCHOTT 8471) and black coloring glass (DEGUSSA 14004) in suspension (in the respective proportions, in weight percent, of the order of 95% for solder glass and 5% for black coloring glass) within an adequate easily evaporable solution such as a amyle-acetate. The purpose of this spraying device 24 is to apply onto the front face of the baseplate elements 11 a film 12 of said slurry, intended to form the bonding and absorbing coating into which the fiber structure is to be then implanted. The film 12 thus applied onto the baseplate elements 11 presents a highly pasty consistence as soon as deposited, because of the early evaporation of the slurry solution from the beginning of the spraying process. This highly pasty consistence of the film 12 still continues to rapidly increase after deposition, due to the further evaporation of the slurry solution in ambiant air, so that the film 12 rapidly takes the aspect of a dried powder coating with poor adherence onto the baseplate elements (the natural drying in ambiant air of this powder coating may be accelerated, if desired, by any known drying means not shown on the drawings).

The baseplate elements 11 thus provided with the poorly adherent glass powder coating 12 are then passed through the heating pretreatment zone 25 arranged downstream of the coating station 23. The purpose of this pretreatment zone 25 is to heat up the glass powder coating 12 to a temperature sufficient (500° C. during one minute) for causing its sintering, so as to induce a certain cohesion between the powder particles while improving the adherence of the overall coating 12 onto the baseplate elements 11, (the above spraying process being besides carried out so as to give a sintered coating having a thickness of the order of 0.2 to 0.3 mm).

The baseplate elements 11 thus provided with the sintered coating 12 are then moved up to the inlet of the fiber implantation zone 26, so as to be submitted to the fiber implantation proper.

In order to enable such a fiber implantation, the overall installation of FIG. 3 further comprises an associated closed-loop line 40, designed for moving up to the inlet of the implantation zone 26 (by conventional means equally not shown on the drawing) a plurality of transfer units 70, previously filled with fibers at an upstream filling station 100 (by means of an injection device 120). These filled transfer units 70 thus moved up to the inlet of the implantation zone 26 are then adequately positioned above the corresponding incoming baseplate elements 11 and partly unloaded of their fiber content onto these baseplate elements 11 (exact positioning and unloading to be described afterwards). These transfer units 70 are then moved together with the baseplate elements 11 along the main line 20 throughout the implantation zone 26, in view of enabling the carrying out of the fiber implantation proper (to be equally described afterwards). The fiber implantation once completed, the emptied transfer units 70 are then finally recirculated by the closed-loop line 40 from the outlet of the implantation zone 26 up to the filling station 100, where they can, after refilling, be directed again towards the inlet of the implantation zone 26.

Each of the transfer units 70 used in the above installation generally consists (FIGS. 4 and 5) of three superposed elements 76, 78 and 79 inserted in a common frame 72 of parallelipipedic shape, i.e., respectively:
a thick grid-like element 76 inserted into or being part of the top of the frame 72, the cross bars 88 of which delimitate a matrix of vertically extending square holes 77 distributed in rows and columns equidistant from one another (this FIG. 6 showing a partial plan view of this grid-like element 76),
a fine mesh 78 (preferably a wire mesh) supported at the lower end of the frame 72 by an appropriately configurated support means 81 (FIG. 7 showing a partial plan view of this mesh 78),
and a bottom 79 disposed below the fine mesh 78, which is slidably mounted in guiding grooves 82 provided in the frame 72, so as to enable its lateral removing from the transfer unit 70.

Figure 4:
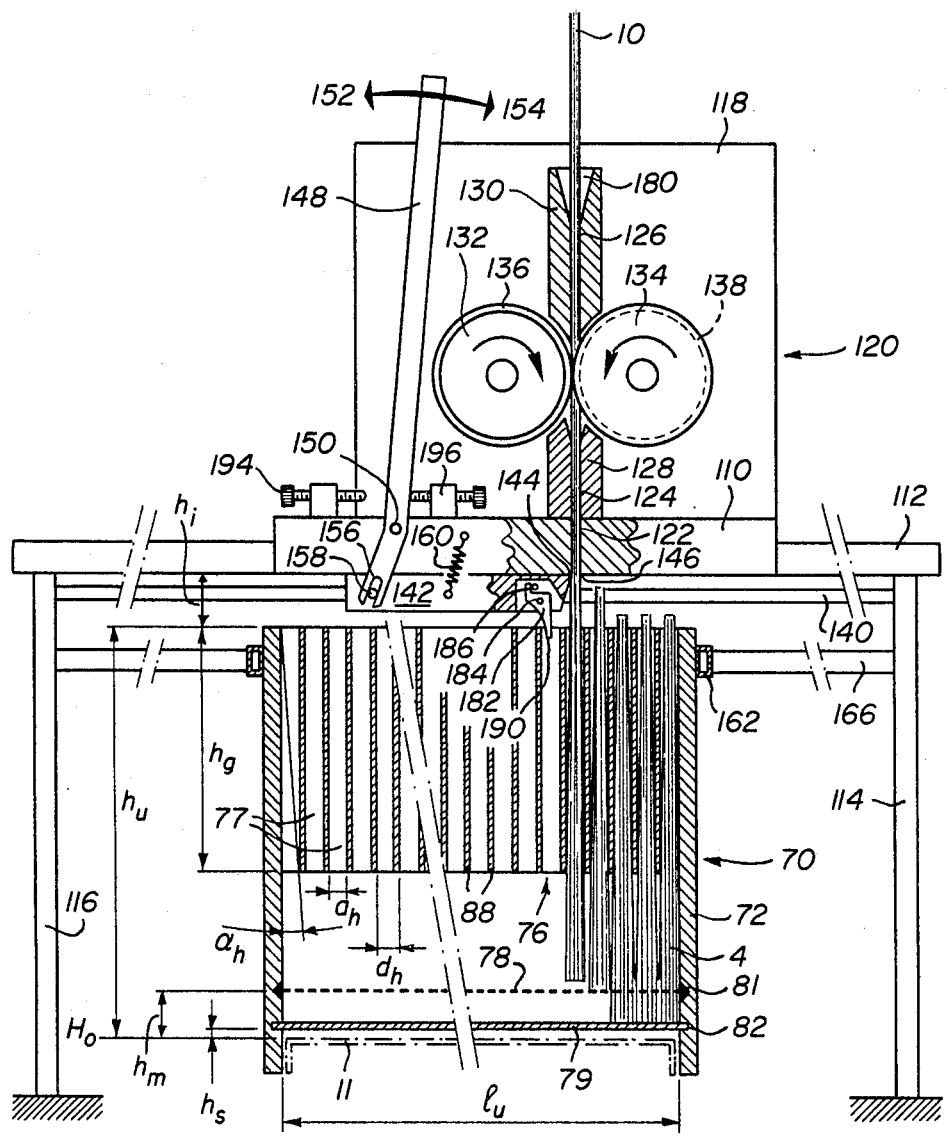
FIG. 4 is a front end view of a device incorporated in the embodiment of FIG. 3.

The transversal dimensions of the transfer units 70 have to be designed in function of the manner of arranging them onto the baseplate elements 11, as well as in function of the injection capacity of the injection machine 120. These transfer units 70 being chosen according to shown embodiment to be arranged (in a side-by-side relationship with respect to one another) transversaly onto the baseplate elements, their "useful" length "$l_u$" (FIG. 4) has, therefore, to be chosen substantially equal to the width of the baseplate elements 11, so as to enable the fiber implantation over the whole area of these baseplate elements. Such a "useful" length "$l_u$" will therefore be chosen of the order of 10 cm, in case of baseplate elements 11 having a width of this size. The overall length of these transfer units will naturally be slightly more than the width of the baseplate elements 11, so as to enable that the lower end of their frame 72 rests, when moved in the implantation zone 26, on each side of the baseplate elements on the main line 20, while their sliding bottom 79 extends slightly above the upper face of these baseplate elements (as indicated in FIG. 4 where there is shown in dotted lines the position to be occupied by the baseplate elements 11 with respect to the transfer units 70 during implantation). The width of the transfer units 70 will in turn depend of the injection capacity of the injection machine 120, to be described afterwards.

The height of the transfer units 70 must besides be chosen such that the height "$h_u$" of the upper face of the grid-like elements 76 above the level implantation $H_o$ (i.e. the "useful" height of the transfer units 70) is slightly less than the length desired for the fiber structure to be implanted (so as to have the upper ends of the fibers still protruding from the upper face of the grid-like elements 76 when already impinging onto the baseplate elements 11). Such a "useful" height "$h_u$" will therefore be chosen, in a preferred manner, of the order of 62 mm, in case one desires to produce a desired fiber structure of 65 mm of length.

The different dimensions of the elements constitutive of the transfer units 70 have at least to be selected mainly in function of the parameters desired for the fiber structure to be implanted. Thus, in view of enabling the implantation of a fiber structure having a length "$h_f$" of the order of 6.5 cm and a fiber density "$n_f$" of the order of 500 fibers/$cm^2$ (corresponding to an average spacing between fibers of the order of 450 $\mu m$), with a maximum allowed fiber angular dispersion "$\alpha_f$" of the order of ±5°, the elements constitutive of the transfer units 70 must be designed so as to present, in a preferred manner, the following dimensions:

height "$h_g$" of the grid-like elements 76 of the order of 35 mm, spacing "$d_h$" between adjacent square holes 77 (along the rows as well as along the columns of holes 77) of the order of 2.5 mm, which corresponds to a number "$n_h$" of holes per square centimeter about equal to sixteen (which thus also corresponds to about four holes per cm along the length as well as along the width of the grid-like elements 76), thickness "$l_g$" of the cross bars 88 of the grid-like elements 76 of the order of 0.5 mm, which leads to an internal opening "$a_h$" of the holes 77 of the order of 2 mm (as well as to an angular opening $\alpha h$ of the order of 2.8°).

height "$h_m$" of the fine mesh 78 above the implantation level $H_o$ of the order of 7 mm (the mesh having besides a mesh size of the order of 125 to 250 μm), and, height "$h_s$" of the sliding bottom 79 above the implantation level $H_o$ of the order of 2 mm.

The exact reasons for which the above dimensions are preferably selected will be given afterwards (such dimensions are however, of course, not restricted to the above figures, and any deviation from these figures in reasonable limits is possible).

The injection device 120 proper arranged at the filling station 100 is designed for performing the sequential filling of each of the transfer units successively brought underneath it. To this end, this injection device 120 includes (FIGS. 4 and 5) an horizontal baseplate element 110 being supported on a table 112 or the like with legs 114 and 116. This injection device 120 also includes a vertical rear plate 118 being secured to the baseplate 110 by suitable fastening means, like screws or bolts (not shown). As apparent from FIGS. 4 and 5, the baseplate 110 is pierced with a plurality of vertically extending bore holes 122 arranged along a row extending transversally ahead of the rear plate 118. Vertically aligned with this first row of bore holes 122 is a second row of bore holes 124 as well as a third row of bore holes 126 provided in plate members 128 and 130, respectively. The plate members 128 and 130 are again secured by conventional fastening means, like screws or bolts (not shown), against the rear plate 118.

Between the plate members 128 and 130 there is provided a driving means for the fiber bundles 10 to be treated. The driving means comprises two engaging rollers 132 and 134, of which one roller 132 is driven by means of an electrical motor 133 attached (FIG. 5) to the side of the rear plate 118 opposite to that where the rollers are mounted. Driven roller 132 is provided with rubber O-rings 136, each of which is attached to a place on the roller in such a way that they contact the fiber bundles 10 inserted into the bore holes, when rolling in a corresponding groove 138 on the opposite roller or drum 134.

Underneath the base plate 110 there is mounted slidably on a guide rail 140 a clipper bar 142, which is movable horizontally a certain distance, so that its longitudinal clipping edge 144 moves over the outlet 146 of the row of bore holes 122.

In case of fiber bundles 10 inserted into the rows of the bore holes 126, 124 and 122, to be described below, such a movement results in a clipping or cutting of the fiber bundles extending beyond the outlet 146 of the bore holes 122.

The guide rail 140 again is secured by conventional fastening means, for instance on the table 112. In the shown embodiment it is fastened on the legs 114, 116 of the table 112. Of course, the guide rail 140 could be mounted on the baseplate 110 as well as on any other element being in fixed relationship with regard to the baseplate 110.

The clipper bar 142 is actuated by means of a lever 148 supported pivotingly around a pivoting bolt 150 secured on the baseplate 110. The lever 148 is pivotably in the directions of the arrows 152 and 154. At its end adjacent to the clipper bar 142 a slit 156 provided in the lever 148 receives a pin 158, so that the lever 148 is connected to the clipper bar. In case the lever 148 is moved in the direction of the arrow 152, the clipper bar is being moved to the right side according to FIG. 4 so that a clipping action with regard to the inserted fiber bundles takes place, when the clipper bar 142 is being moved over the outlet of the bore hole 122. In case the clipped bar 142 is being moved in the direction of arrow 154, the clipped bar 142 is being moved to the left side according to FIG. 4 in the position shown in FIG. 4. During the clipping action, the clipper bar 142 may be maintained close against the baseplate 110 (without nevertheless causing too much friction) by means of a spring 160 being mounted with both ends to the baseplate 110 and the clipper bar 142, respectively.

Not shown in the drawings are the bobbins carrying the wound fiber bundles 10 to be fed into the bore holes 126, 124 and 122 of the plate members 130, 128 and the baseplate 110. These bobbins may be supported in a known manner above the injection device 120 so as to allow the simultaneous drawing off of the bundles 10 during the injection process (the step advancement of the bundles during this injection process being furthermore likely to be dampened by conventional dampening auxiliary rollers or stretching arms).

Underneath the baseplate 110 and the clipper bar 142 of the injection device 120 there is arranged an empty transfer unit 70 to be sequentially filled. This transfer unit 70 is removably mounted in an adequate support 162 (such as a frame surrounding the upper part of the frame 72 of the transfer unit 70), which is in turn mounted slidably, by one of its sides on a guiding member 166 being secured to the legs 114 and 116 of the table 112. (Again, the guiding member 166 could be secured at any other points as well being in fixed relationship with the baseplate 110 or rear plate 118. With an appropriate configuration of the guiding member 166 it could be secured too on one of those last mentioned structural elements, the baseplate 110 or the rear plate 118.) When mounted in the support 162 the transfer unit 70 may for instance be secured to it by set screws, not shown on the drawing. This mounting is besides arranged so that the gap "$h_i$" between the upper surface of the grid-like element 76 of the transfer unit 70 and the outlet 146 of the bore holes 122 is typically, for reasons which will be explained below, not more than 15 mm (for instance 12 mm).

The above mounting of the transfer unit 70 underneath the injection device 120 is furthermore arranged in such a manner that the transfer unit 70 is slidably movable along the guiding member 166 in the direction of its length, so that the different rows of holes 77 along its width extend parallely to the rows of holes 122, 124 and 126 of the injection device 120. This injection device 120 must of course be designed so as to have each hole in its rows of holes 122, 124 and 126 aligned with the corresponding hole of the row of holes 77 extending below them. The holes 77 of the grid-like elements 76 being preferably spaced of about 2.5 mm from one another as said above, the holes of the respective rows of holes 122, 124 and 126 must therefore be arranged with respect to one another according to the same spacing of 2.5 mm.

The injection device 120 of the shown embodiment being furthermore designed for having its row of bore holes 126, 124 and 122 comprising ten holes each (as it can be shown from FIG. 5), the transfer unit 70 must in turn be designed for having the same number of holes along its width, which leads to an overall width of 2.5 cm for the transfer unit 70 (this transfer unit 70 besides comprising fourty holes along its "useful" length, taking into account the above-given value of 10 cm for this "useful length"). The injection device 120 must furthermore comprise ten bobbins arranged above it because of its "ten-hole" rows of bore holes 122, 124 and 126, so as to allow the simultaneous drawing off of ten bundles 10 during the injection process. Each of these bundles 10 must at last consist, in a preferred manner, of about thirty-two fibers, in order to enable (taking into account the above-cited figure of about sixteen holes 77 per cm$^2$ with regard to the grid-like element 76 of the transfer units 70) the production of a fiber structure having a desired density of the order of 500 fibers/cm$^2$. (The process and installation according to the invention is however, of course, not restricted to this number of fibers, and any deviation from this number in reasonable limits is possible).

In order to drive the sequential advancement of the transfer unit 70 in direction of its length, the clipper bar 142 of the injection device 110 includes at last, as best shown in FIG. 4, a ratchet 182 being pivotably mounted on a pin 184 secured with its other end on the clipper bar 142. The clipper bar 142 also includes a stop member 186 arranged in such a way that the ratchet 182 is pivotable only counterclockwise. This leads to the result that in connection with each clipping action of the clipper bar 142 the extended end 190 of the ratchet 182 engages the other end of one cross bar 88 of the grid-like element 76, whereby the transfer unit 70 mounted slidably on the guiding member 166 is being also moved together with the clipper bar 142 to the right according to FIG. 4. The spacing "$d_h$" of subsequent cross bars 88 corresponds always to one operational step of the clipper bar 142 being defined by the movement of the lever 148. Hence, during each clipping action of the clipper bar 142 the transfer unit 70 is transported always a distance equal to one spacing "$d_h$", which means that during each clipping action a new row of holes 77 of the grid-like element 76, i.e. the following row, is brought underneath the rows of bore holes 122, 124 and 126.

The pivotal movement of the lever 148 can be adjusted by abutment members 194 and 196, being set screws threadably mounted in protrusions of the baseplate 110.

Taking into account the above description, the filling of the transfer unit 70 arranged underneath the injection device 120 is therefore performed as follows:

The initial insertion of the fiber bundles 10 into the injection device 120 is firstly realized by feeding ten fiber bundles 10 of thirty-two fibers each into a funnel 180 of the plate member 130 and furtheron into its ten bore-holes 126 (the funnel 180 having for purpose of facilitating the introduction of the bundles 10 into the bore holes 126). Once the bundles 10 arrive into contact with the rollers 132 and 134, they are then moved forward through these rollers (by driving these rollers manually if needed), and then through the ten bore holes 124 and 122, until they protrude slightly from the outlet 146 of the bore holes 122. An initial clipping action is then carried out by moving the lever 148 as described below, so as to equalize the lever ends of the bundles 10 at the level of the outlet 146.

The initial insertion of the fiber bundles 10 once completed, the empty transfer unit 70 is then arranged so as to have its first row of holes 77 from its right-hand side on the drawing aligned with the respective rows of holes 122, 124 and 126, in view of enabling the filling of this first row (the transfer unit 70 is in fact shown on the FIG. 4 during the filling of its fourth row, this for the sake of better understanding of the injection process). The transfer unit 70 once correctly arranged, the roller 132 is then driven by its motor 133 via a conventional control unit (not shown) so that the rollers 132, 134 advance the ten bundles 10 from the outlet 146 of the bore holes 122 into the corresponding ten holes of the first row of holes 77 of the grid-like element 76, which acts as a guiding means for these bundles (the injection gap "$h_i$" between the holes 122 and 77 being chosen not more than 15 mm, as said above, precisely for reasons of security of injection, in view of compelling all the fibers of a given bundle to be properly introduced into the corresponding hole 77). The driving of the roller 132 is continued until the bundles are advanced for a length corresponding to that desired for the fiber structure to be implanted (i.e. corresponding to the actual length of the clipped fibers 4 shown in the right-hand side of the transfer unit 70 on FIG. 4). The advancing of the bundles 10 for the desired length may for instance be realized by one turn of the rollers 132, 134, whereby these rollers are then designed for having a peripheral length corresponding to this desired length for the clipped fibers. This one turn of the rollers 132 and 134 being completed, the motor 133 is then stopped, so that the bundles 10 are then arranged underneath the outlet 146 of the bore holes 122 as shown in FIG. 4 (the lower ends of the bundles 10 in particular protruding at the desired level above the mesh 78, while undergoing a slight transverse prespreading).

Now the clipping action can be carried out by moving the lever 148 manually into the direction of arrow 152. Accordingly, clipping edge 146 cuts the pending part of the bundles 10 at the outlet 146, which causes the falling with further transverse spreading of the fibers 4 of the clipped bundles 10 through the mesh 78 onto the sliding bottom 79, thereby leading to a substantially uniform distribution of said clipped fibers 4 onto the sliding bottom 79. The overall transverse spreading of the clipped fibers 4 is furthermore limited throughout their falling by their continuous guiding through the holes 77 of the grid-like element 76, thereby leading to a substantially parallel extension of the clipped fibers 4 from the sliding bottom 79.

As can be seen in FIG. 4, during the clipping action the ratchet 182 is being moved also to the right of FIG. 4. In view of the abutment of its lower end 190 with regard to the upper end of a cross-bar 88 of the grid-like element 76 the whole transfer unit 70 is being moved also as a whole to the right side. As a result the next row of holes 77 of the grid-like element 76 is being aligned with regard to the bore holes 122, 124 and 126.

Upon return of the cliper bar 142 and its associated lever 148 into the position shown in FIG. 4 the ratchet 182 pivots about the pin 184 in a counter-clockwise direcion as long as the lever 148 is being moved for backward transport of the clipper bar 142 into the direction of arrow 154 and as long as the ratchet is in contact with one cross-bar 88. As soon as it comes out of contact with the respective cross-bar 88 during this returning movement it falls down again into the position shown in FIG. 4.

After return of the lever 148 into the position according to FIG. 4 the rollers 132 and 134 acting as a driving means can be rotated again for one turn by actuation of the motor 133 in order to advance a new length of bundles 10 through the next row of holes 77 of the grid-like element 76, whereupon the above-described cycle can be repeated as often until all the rows of holes 77 are filled with fibers 4.

After all the rows of holes 77 of the transfer unit 70 are stepwise filled with fibers as shown and described with connection to FIGS. 4 and 5, the filled transfer unit 70 is then removed from the support 62 slidably mounted on the guiding member 66, and moved forward (FIG. 3) along the closed-loop line 40 in direction of the main line 20, while another empty transfer unit 70 is arranged underneath the injection device 120 for being sequentially filled as above described.

Throughout the above handling of the filled transfer unit 70 (i.e. the step-advancing of the transfer unit during the filling process followed by the moving of the filled transfer unit up to the main line 20), the possible disturbance by such handling of the substantially uniform distribution of the clipped fibers 4 inside the transfer unit 70 is precisely avoided thanks to the presence of the fine mesh 78, which thus acts as a distribution-maintaining means with respect to these clipped fibers 4.

The filling rate of the injection device 120 is adapted to the step-advancement speed of the main line 20, so as to enable the filling of a certain series of transfer units 70 (advantageously, the filling of about forty transfer units in the shown embodiment) between two consecutive step-advancements of the main line 20. Once filled, this series of transfer units 70 is then moved up to the inlet of the implantation zone 26 of the main line 20 (FIG. 3), and the transfer units 70 of this series are successively positioned, in a side-by-side relationship, transversally onto the corresponding incoming baseplate element 11 (in the manner indicated in dotted lines on the FIG. 4). The sliding bottoms 79 of the transfer units 70 are furthermore immediately removed after each positioning of these transfer units 70, so that the clipped fibers 4 arranged inside are going to fall down and come to a rest onto the sintered glass coating 12 of the baseplate element 11, while keeping onto said coating 12 the same substantially uniform distribution as inside the transfer units. The sliding bottoms 79 proper are after their removal recirculated along an additional line 42 joining the closed-loop line 40 downstream the outlet of the implantation zone 26, so as to be subsequently mounted again inside the emptied transfer units. The possible disturbance of said substantially uniform distribution of the clipped fibers 4 by the lateral removing of the sliding bottoms 79 is again avoided thanks to the presence of the mesh 78, which always acts as a distribution-maintaining means.

The sliding bottoms 79 proper are after their removal recirculated along an additional line 42 joining the closed-loop line 40 downstream the outlet of the implantation zone 26, so as to be subsequently mounted again inside the emptied transfer units.

The baseplate elements 11 thus provided with their transfer units 70 then continue to be moved along the main line 20, together with the transfer units 70, so as to be passed through a heat treatment zone 28 designed for enabling the carrying out of the fiber implantation proper. To this end, the heat treatment zone 28 is adapted for applying onto the sintered glass coating 12 the thermal treatment illustrated on the diagram of the FIG. 8, which can be carried out in a conventional manner by an adequate distribution along the heat treatment zone of known heating mass, not shown on the drawing (such a heating arrangement being designed in a preferred manner so as to heat up the coating 12 from below the baseplate elements 11 by using for instance adequate gas flame or resistance heating means, so as to avoid a possible degradation of the fibers resting above the baseplate elements). According to the diagram of FIG. 8, the sintered glass coating 12 of the baseplate elements 11 is firstly heated, in a first part 28a of the treatment zone 28, up to the melting point of the glass mixture constitutive of the coating, so as to enable the sticking of the fibers 4 into said molten glass coating. The fixation to the molten coating 12 of said stuck fibers 4 may be further improved by applying a certain pushing down (schematically illustrated by the arrows 29 on the drawing) onto the upper ends of the fibers 4 protruding from the top of the transfer units 70, so as to increase the penetration of said stuck fibers 4 into the thickness of the molten coating 12 (said molten coating 12 furthermore causing, because of its good wetting properties with respect to the fibers 4, the formation of a positive meniscus around the clipped fibers 4, whereby contibuting to still reinforce their fixation). During the heating of the coating 12 up to its melting point, the possible disturbance of the substantially uniform distribution of the clipped fibers 4 by an eventual elastoviscous flowing of said molten coating 12 is once again avoided thanks to the presence of the mesh 78, which always acts as a distribution-maintaining means.

The fibers 4 once correctly implanted into the molten glass coating 12, the baseplate elements 11 are then moved forward through a second part 28b of the heat treatment zone 28, so as to cause the cooling down of this molten glass coating 12 up to its annealing temperature, for which this coating is already solidified into an homogeneous black glassy composition. Such a solidified black glassy coating 12 may be thus qualified as a "black enamel coating", according to the terminology currently used in the glass technique (for which the word "enamel" is currently used for designating any glassy coating applied on any product, preferably made of metal). The baseplate elements 11 thus provided with such a black enamel coating are then kept inside the second part 28b a certain period of time to annealing temperature, so as to prevent any stress formation inside said coating. The annealing treatment once terminated, the baseplate elements are then further moved forward through a third part 28c of the treatment zone 28, where the solidified black enamel coating 12 is then progressively cooled down to the ambient temperature, whereby causing a definitive and firm securing of the fibers 4 to this solid black enamel coating 12.

During this whole cooling treatment, the possible mismatch between the thermal expansion coefficients of the coating 12 and of the baseplate element 11 could however provoke, if no special precaution was taken, a bending of the baseplate element 11 likely to be prohibitive with respect to the parallelism desired for the fiber structure 3 implanted into it. Such a possible bending is precisely avoided in the described embodiment thanks to the proper stiffening of the baseplate elements 11 by means of the transversal minicorrugations 16.

The fibers 4 once firmly secured to the baseplate elements 11 by means of the black enamel coating 12, the photothermal converter elements 31 thus produced are then advanced up to the outlet of the implantation zone 28, where the transfer units 70 are then upwardly removed so as to be completely withdrawn from the fibers 4 of said photothermal converter elements 31. The transfer units 70 thus emptied are then recirculated along the closed-loop line 40 up to the filling station 100, while the photothermal converter elements 31 are moved in a temporary storing zone 30.

The photothermal converter elements 31 thus produced may then advantageously be assembled in a side-by-side relationship so as to form a photothermal converter apparatus 36 of much larger size, the different elements 31 of which are kept together thanks to the providing of inlet and outlet manifolds 35 to which the tubes 15 of each element 31 are connected. Such a photothermal converter apparatus 36 may then be incorporated in a known manner in a flat plate collector.

In the above-described embodiment, it may be therefore especially seen that the fine mesh 78 arranged inside the transfer units 70 has for major function of acting as a distribution-maintaining means with respect to the clipped fibers 4 throughout the different treatments applied subsequently to the placing of said fibers 4 inside the transfer units 70, i.e. respectively, during the whole handling of the transfer units 70, then during the removal of the sliding bottom 79, and finally during the thermal treatment applied to the coating 12 for bringing it to its molten state and for resolidifying it. Such a function of "maintaining of the fiber distribution" may be still reinforced by choosing of progressively withdrawing the transfer units 70 from the fibers 4 during the solidification process of the coating 12 (instead of withdrawing them in one step) at the end of the solidification of said coating as above-described), so as to further improve the parallelisation of the already secured fibers 4.

In the above-described embodiment furthermore, the preferred figures cited with regard to the different dimensions of the elements constitutive of the transfer units 70 (of which some are dependant of the parameters desired for the fiber structure) have been selected according to the following reasons:

The height "$h_m$" of the mesh 78 above the implantation level $H_o$ (FIG. 4) must firstly be kept as small as possible so as to help at best to maintain the proper distribution of the clipped fibers 4, but nevertheless large enough so as to ensure that the differential thermal expansion effect between the mesh 78 and the baseplate element 11 remains negligible during the implantation operation inside the heat treatment zone 28. Typically, this height "$h_m$" is chosen approximatively equal to 7 mm. The mesh width of this mesh 78 is furthermore designed so as to be less than the average fiber-to-fiber distance desired for the fiber structure, but of course above the fiber diameter. In case of a fiber structure having fibers with a diameter of about 65 μm spaced apart from one another of about 450 m, this mesh width will be typically chosen of the order of 125 to 250 μm.

The height "$h_s$" of the sliding bottom 79 above the implantation level $H_o$ must then be kept as small as possible, while nevertheless remaining large enough so as to ensure a proper removal of the bottom 79 for subsequent implantation. Typically, this height "$h_s$" is chosen approximately equal to 2 mm.

The useful height "$h_u$" of the transfer unit 70 above the implantation level $H_o$ must furthermore be selected in function of the two different following requirements: the free lower ends of the bundles 10 advanced in the holes 77 of the grid-like element 76 must firstly imperatively protrude above the mesh 78 at the moment of the clipping operation, so as to cause their transverse spreading (by the clipping action) before the clipped fibers are passed through the mesh 78. Such a requirement may be expressed by the following relationship:

$$h_u > h_f - h_i + h_m$$

which becomes $$H_u > h_f - 5 \text{ mm}$$

when replacing $h_i$ and $h_m$ by their above-cited preferred values (respectively 12 mm for $h_i$ and 7 mm for $h_m$).

The other requirement for the proper selection of the height "$h_u$" is that the upper ends of the clipped fibers 4 must, in a preferred manner, still protrude from the upper face of the grid-like element 76 when already impringing onto the baseplate element 11, so as to enable their pushing down from above during the implantation operation. This other requirement may thus be expressed by the following relationship:

$$h_u < h_f$$

which gives for the height "$h_u$" the overall conditions:

$$H_f - 5 \text{ mm} < h_u < h_f$$

This explains why this height "$h_u$" has been selected approximately equal to 62 mm, in case of a desired length $h_f$ of the order of 65 mm for the fiber structure.

The height "$h_g$" of the grid-like element 76 must for its part be chosen as large as possible to ensure a correct guidance of the clipped fibers 4 throughout their falling as well as to minimize their angular dispersion, but nevertheless not too large to avoid a possible "bunching" effect of the clipped fibers in the immediate vicinity of the mesh 78. This height "$h_g$" must therefore be typically selected so as to be approximatively comprised between 30 and 40 mm (for instance 35 mm), in case of a transfer unit 70 having a useful height $h_u$ of about 62 mm.

The spacing "$d_h$" between adjacent holes 77 of the grid-like elements 76, as well s the thickness "$l_h$" of the crossbars 88 delimitating these holes 77 (and thus the "internal opening "$a_h$" of these holes 77), must besides be selected in function of the following requirements: The thickness "$l_h$" of the crossbars 88 must firstly be kept as small as possible, in view of enabling a maximum injection security of the bundles 10 as well as a minimum "bunching effect" of the clipped fibers 4. This thickness "$l_h$" is typically chosen, for practical reasons of the order of 0.5 mm. The spacing "$d_h$" must furthermore be chosen as large as possible (or imersely the number "$n_h$" of holes 77 per cm² as small as possible, together with the number of fibers within each bundle as large as possible in view of enabling a high injection rate of the bundles 10, but nevertheless not too large in view of keeping the angular fiber dispersion within acceptable limits. This explains why this spacing "$d_h$" must be typically chosen so as to be comprised between 2 and 3 mm. The choice of a spacing "$d_h$" equal for instance to about 2.5 mm (this giving an internal opening "$a_h$" of about 2 mm) will as a matter of fact enable to keep the angular fiber despersion well within the maximum allowed dispersion "$h_f$" of the order of ±5° for the fiber structure (since the angular opening "$\alpha_h$" of the holes 77, such as defined by the relation $tg\alpha_h = a_h/h_g$, will be then of the order of 2.8°), while simultaneously enabling a filling rate along the length of the transfer units 70 of the order of 90 m per hour (by assuming an injection rate of the order of ten injections per sec., which appears the maximum realizable together with a correct security).

The thickness of the external frame 72 of the transfer unit 70 must finally, at least along its length, be kept as small as possible (preferably of the order of the thickness of the crosswalls 88) so as not to interrupt the uniform distribution of the fibers between the adjacent transfer units arranged in a side-by-side relationship onto the same baseplate element 11.

The transversal dimension of the transfer units 70 are, for their part, not restricted at all to the values given by way of example in the above-described embodiment, and may quite on the contrary be varied largely in function of the size of the photothermal convertion elements 31 to be produced, as well as in function of the injection capacity of the injection device 120. One may thus envisage for instance to rise an injection device capable of advancing forty bundles at the same time by means of "forty-hole" rows of base holes 122, 124 and 126, instead of the ten bundles previously described. In that case, one may thus envisage to conjointly use transfer units 70 comprising forty holes 77 along their width, and to then arrange such transfer units 70 longitudinally onto the baseplate elements 11 instead of transversally as previously, these transfer units 70 being furthermore able to present as many holes 77 along their length as desired (thereby giving the possibility of covering a whole baseplate element 11 with only four transfer units in case of transfer units prossessing one hundred holes 77 along their length, or even with a single transfer unit in case of transfer unit prossessing four hundred holes 77 along its length).

Figure 9:
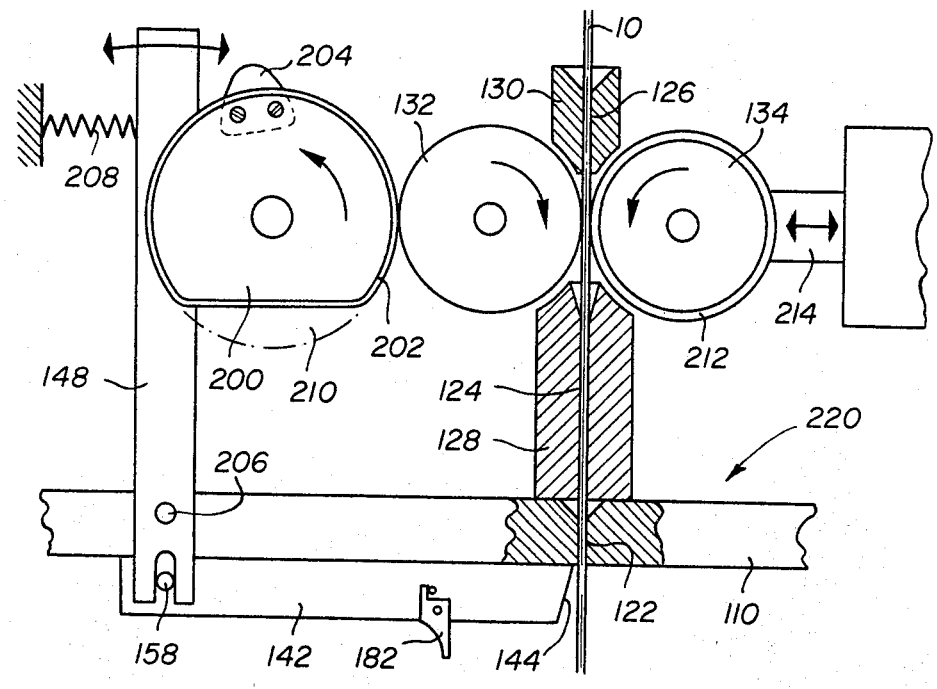
FIG. 9 is a front end view similar to FIG. 4, showing a first variation.

FIG. 9 illustrates the principles of an embodiment of the injection device according to the invention more elaborated than that of FIGS. 4 and 5, which provides for a practically fully automatized operation of the driving action of the fiber bundles in connection with the clipping action of the clipper bar and of the advancement of the transfer unit. In this injection device 220 according to FIG. 9, similar parts with regard to the device 120 of FIGS. 4 and 5 are provided with similar reference numerals. For the sake of clarity only the differences between the embodiment of FIG. 9 with regard to that of FIGS. 4 and 5 will be described below. The transfer unit 70 being furthermore arranged in the same way as shown in FIG. 4, this is the reason why it is not shown once again in FIG. 9.

In FIG. 9 there is provided an actuation wheel 200 provided with a rubber O-ring 202. It also bears a cam 204 for actuation of the lever 148, which is pivotably supported on a pin 206 and biased into the direction against the actuation wheel by a spring 208.

As shown in FIG. 9 a segment 210 is removed from the actuation wheel 200, so that the roller 132 driven by the rotating actuation wheel 200 is driven intermittently. The peripheral length of the circular perimeter of the actuation wheel is chosen according to the desired length of the fibers 4 to be clipped off the bundles 10. During one turn of the actuation wheel 200, the cam 204 actuates one time the lever 148 into the left hand side direction according to FIG. 9, which results in a clipping action of the clipper bar 142 clipping the bundles 10 at the outlet 146 of the bore holes 122.

The actuation wheel 200 is again driven by an electrical motor. Due to the removal of the segment 210 the actuation wheel can rotate continuously producing, however, the desired intermittent operation of the driving means comprised of the rollers 132 and 134 in connection with the clipping operation of the clipper bar 142.

In the embodiment of FIG. 9 the drum 134 is provided with a rubber cylinder 212 to insure a proper driving action in between the roller 132 having a metal surface and the roller 134. For the same reason roller 134 of FIG. 9 is supported on a spring-loaded arm 214 biased in the direction against roller 132 increasing the intended frictional contact between both the rollers 132 and 134. This spring-loaded arm 214 has also for additional function of allowing a smooth and easy initial introduction of the fiber bundles 10 into the injection machine 220, according to the following sequence: the roller 134 is firstly separated from the roller 132 while the mobile arm 214 is blocked in this open position; the fiber bundles 10 are then introduced by hand through their first and second row of bore holes 130 and 128; and the mobile arm 214 finally released from the open position so as to allow the pressing of the roller 134 against the roller 132 (the grooves 138 and the rubber O-rings 136 of FIGS. 4 and 5 being no longer necessary in this embodiment, because of the above-described sequence, and thus simply replaced by the rubber cylinder 112 acting as a friction increasing surface).

The automatized injection device 220 of FIG. 9 (together with a transfer unit 70 such as that of FIGS. 4 and 5 mounted unterneath it) was successfully operated up to a speed of 7.5 cycle/sec. There is no reason, however, to consider this speed to be the maximum speed achievable. In connection with an appropriate motor still higher speeds are possible.

Figure 10:
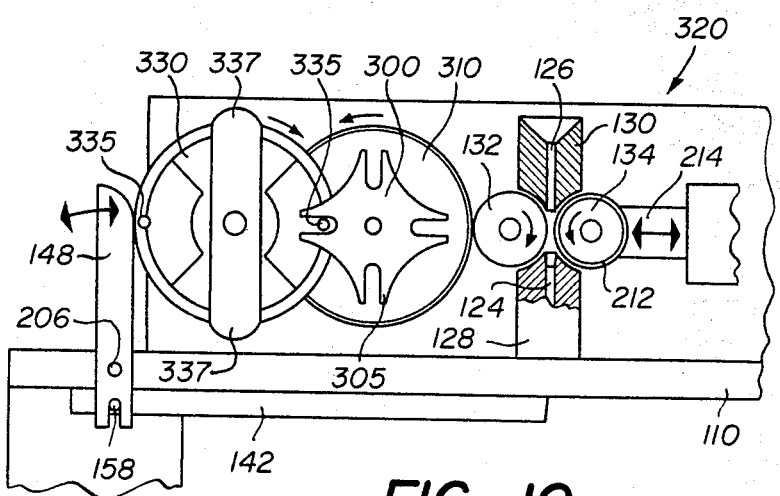
FIG. 10 is a front end view similar to FIG. 4, showing a second variation.

The FIG. 10 illustrates the principles of the most preferred embodiment of the injection device according to the invention. In the injection device 320 according to FIG. 10, similar parts with regard to the embodiments of FIGS. 4 and 5 and FIG. 9 are provided with similar reference numerals. And only the differences between this embodiment of FIG. 10 with regard to that of FIGS. 4 and 5 or FIG. 9 will be described below for the sake of clarity.

In this injection device 320 of FIG. 10, the actuating wheel 200 according to FIG. 9 (designed for step-rotating the roller 132) is replaced by a Geneva wheel 300 engaging the roller 132 by means of a wheel 310 mounted on the same shaft as the Geneva wheel 300. This Geneva wheel 300 is step-rotated and thus the roller 132 in a known manner by a continuous rotating wheel 330, (driven by a conventional motor not shown in the drawing) provided with two diametrally opposed pins 335 engaging the groover 305 of the Geneva wheel 300. The wheel 330 is further provided with two diametrally opposed cams 337, designed for driving two successive step-rotatings of the Geneva wheel 300 between the clipper bar 142 by means of the lever 148.

What we claim is:

1. A process for manufacturing a photothermal converter element comprising
   (A) providing a baseplate element,
   (B) coating the baseplate element with a solidifiable adhesive which is adapted for absorbing incident photon energy,
   (C) supplying bundles of fibers transparent to photon energy and of a predetermined length,
   (D) downwardly passing an array of fiber bundles substantially parallel to each other through guide holes to a desired level above the baseplate element,
   (E) allowing the fibers to freefall from the desired level above the baseplate element and to spread transversely from the bundles a preselected distance such that the fibers distribute substantially uniformly on the baseplate element and make adherent contact with the adhesive, and
   (F) solidifying the adhesive to firmly attach the fibers to the baseplate element.

2. The process of claim 1 wherein elongated bundles of fibers are supplied and guided to the desired level above the baseplate element and the fibers are thereafter allowed to freefall by clipping the fiber bundles to the predetermined length.

3. The process of claim 2 comprising coating the baseplate element with the solidifiable adhesive in a solid state and subsequently treating the adhesive to produce a plastic state for adherence of the fibers.

4. The process of claim 2 comprising coating the baseplate element with the solidifiable adhesive in a plastic state.

5. The process of claim 2 wherein the baseplate element is comprised of metal and the fibers are comprised of glass.

6. The process of claim 5 further comprising coating the fibers with a material having low diffusion properties.

7. The process of claim 2 for further maintaining and improving the uniform distribution of the fibers comprising guiding an array individual fibers during freefall into contact with the adhesive.

8. The process of claim 7 which comprises temporarily supporting the fibers after freefall in a substantially uniform distribution prior to contact with the adhesive on the baseplate element.

9. A continuous process for manufacturing photothermal converter elements comprising
   (A) providing a temporary fiber holder comprising an array of downwardly extending guide holes, a mesh array therebelow and temporary support means below the mesh array,
   (B) supplying bundles of fibers transparent to photon energy,
   (C) downwardly guiding the fiber bundles through guide holes in the temporary fiber holder,
   (D) clipping the fiber bundles at a predetermined length above the temporary fiber holder and allowing the fibers to freefall through the mesh array and distribute substantially uniformly onto the temporary support means,
   (E) providing a baseplate element coated with a solidifiable adhesive adapted for absorbing photon energy below the temporary support means,
   (F) removing the temporary support means causing the fibers to fall onto and contact and adhere to the adhesive on the baseplate element,
   (G) solidifying the adhesive coating to firmly attach the fibers to the baseplate element, and
   (H) removing the baseplate element and the fibers from beneath the temporary fiber holder.

* * * * *

UNITED STATES PATENT OFFICE
CERTIFICATE OF CORRECTION

PATENT NO. : 4,375,380

DATED : March 1, 1983

INVENTOR(S) : Pierre Genequand; Guy Negaty-Hindi; Daniel Gross; Hermann Pfeifer; and Reinhard Kalbskoph It is certified that error appears in the above-identified patent and that said Letters Patent are hereby corrected as shown below:

Cover page, inventors' names, "Pierre Genequand, Guy N. Hindi, Daniel Gross, Hermann Pfeifer, Reinhard Kalbskoph" should read -- Pierre Genequand, Guy Negaty-Hindi, Daniel Gross, Hermann Pfeifer, Reinhard Kalbskoph --

Signed and Sealed this

Fifth Day of March 1985

[SEAL]

Attest:

DONALD J. QUIGG

Attesting Officer

Acting Commissioner of Patents and Trademarks